(12) United States Patent
Seko

(10) Patent No.: US 9,739,629 B2
(45) Date of Patent: Aug. 22, 2017

(54) LOCATION DISPLAY SYSTEM, LOCATION DISPLAY METHOD, AND LOCATION DISPLAY PROGRAM

(71) Applicant: AISIN AW CO., LTD., Anjo-shi, Aichi-ken (JP)

(72) Inventor: Masanobu Seko, Sanda (JP)

(73) Assignee: AISIN AW CO., LTD., Anjo (JP)

(*) Notice: Subject to any disclaimer, the term of this patent is extended or adjusted under 35 U.S.C. 154(b) by 44 days.

(21) Appl. No.: 14/777,544

(22) PCT Filed: Mar. 14, 2014

(86) PCT No.: PCT/JP2014/056901
§ 371 (c)(1),
(2) Date: Sep. 16, 2015

(87) PCT Pub. No.: WO2014/171240
PCT Pub. Date: Oct. 23, 2014

(65) Prior Publication Data
US 2016/0273934 A1    Sep. 22, 2016

(30) Foreign Application Priority Data
Apr. 16, 2013 (JP) ................. 2013-085795

(51) Int. Cl.
*G01C 21/00* (2006.01)
*G01C 21/36* (2006.01)

(52) U.S. Cl.
CPC ....... *G01C 21/3667* (2013.01); *G01C 21/367* (2013.01); *G01C 21/3635* (2013.01); *G01C 21/3682* (2013.01)

(58) Field of Classification Search
None
See application file for complete search history.

(56) References Cited

U.S. PATENT DOCUMENTS 5,917,436 A * 6/1999 Endo .................. G01C 21/3635
340/988
6,006,161 A * 12/1999 Katou .................. G08G 1/0969
340/988

(Continued)

FOREIGN PATENT DOCUMENTS

EP         0738876 A2   10/1996
JP     H08-292715 A    11/1996

(Continued)

OTHER PUBLICATIONS

Feb. 17, 2016 Supplementary Search Report issued in European Patent Application No. 14785289.1.

*Primary Examiner* — John R Olszewski
*Assistant Examiner* — James M McPherson
(74) *Attorney, Agent, or Firm* — Oliff PLC

(57) ABSTRACT

Location display systems, methods, and programs acquire guide location information and display a map including the guide locations, as viewed from a reference eyepoint. When a first one of the guide locations and a second one of the guide locations are not close to each other by a predetermined reference distance or shorter, the systems, methods, and programs set guide icons such that, between an icon of a first guide location and an icon of a second guide location, the icon of the guide location closer to the reference eyepoint is displayed preferentially. When the first guide location and the second guide location are close to each other by the predetermined reference distance or shorter, the systems, methods, and programs set the guide icons such that the icon of the guide location having a higher order of precedence in preset preference rules is displayed preferentially.

5 Claims, 3 Drawing Sheets

(56) References Cited

U.S. PATENT DOCUMENTS

| | | |
|---|---|---|
| 6,347,279 B1 | 2/2002 | Morimoto |
| 2005/0283305 A1 | 12/2005 | Clark et al. |
| 2010/0110314 A1* | 5/2010 | Kusano .............. G01C 21/3667 |
| | | 348/837 |
| 2011/0010650 A1 | 1/2011 | Hess et al. |
| 2013/0345980 A1* | 12/2013 | van Os .............. G01C 21/3626 |
| | | 701/538 |

FOREIGN PATENT DOCUMENTS

| | | |
|---|---|---|
| JP | 2000-346656 A | 12/2000 |
| JP | 2002-107155 A | 4/2002 |
| JP | 2004-144721 A | 5/2004 |
| JP | 2007-139931 A | 6/2007 |
| JP | 2009-009546 A | 1/2009 |
| JP | 2009-025650 A | 2/2009 |
| JP | 2012-225751 A | 11/2012 |

\* cited by examiner

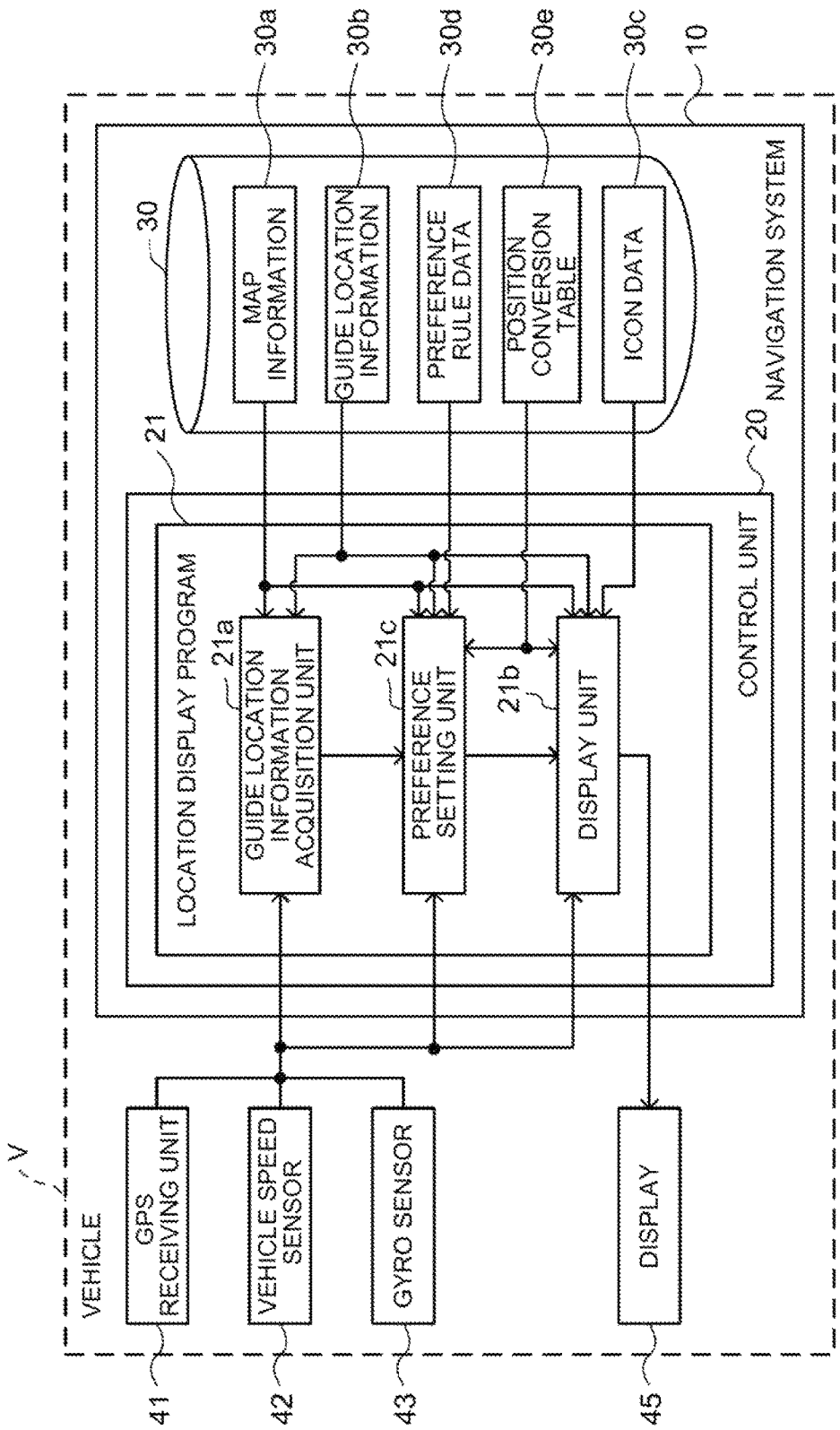

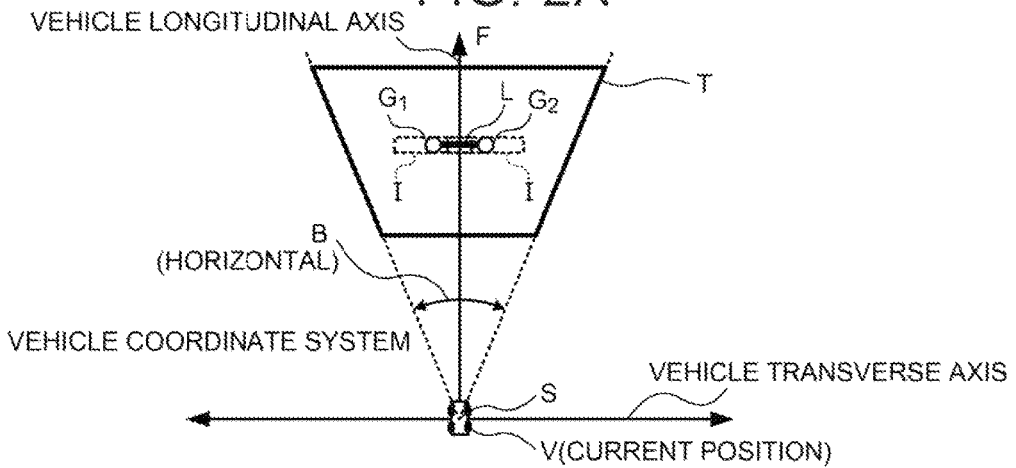
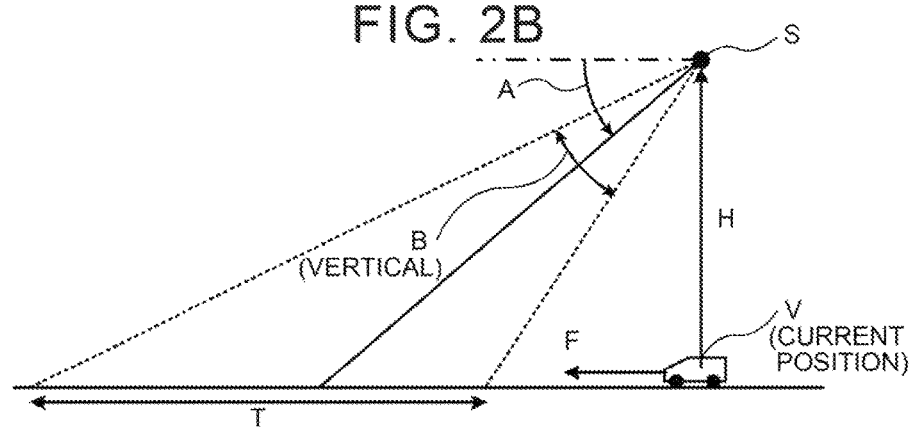
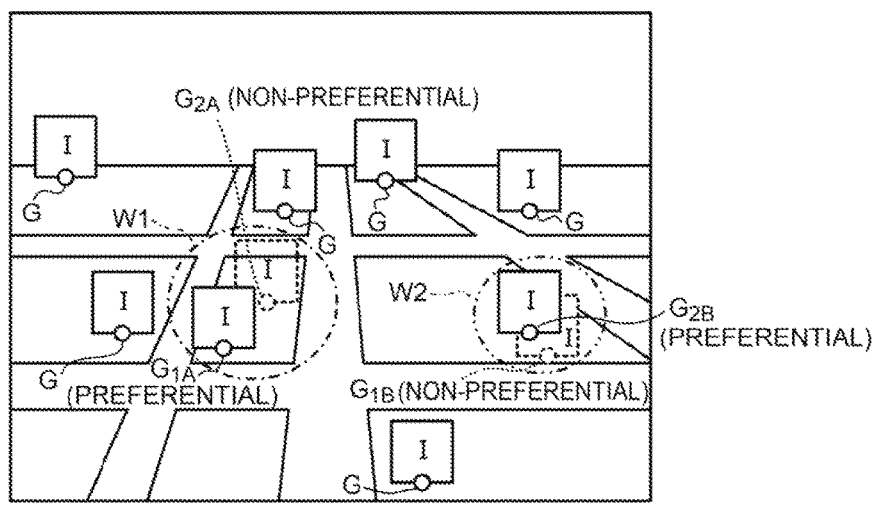

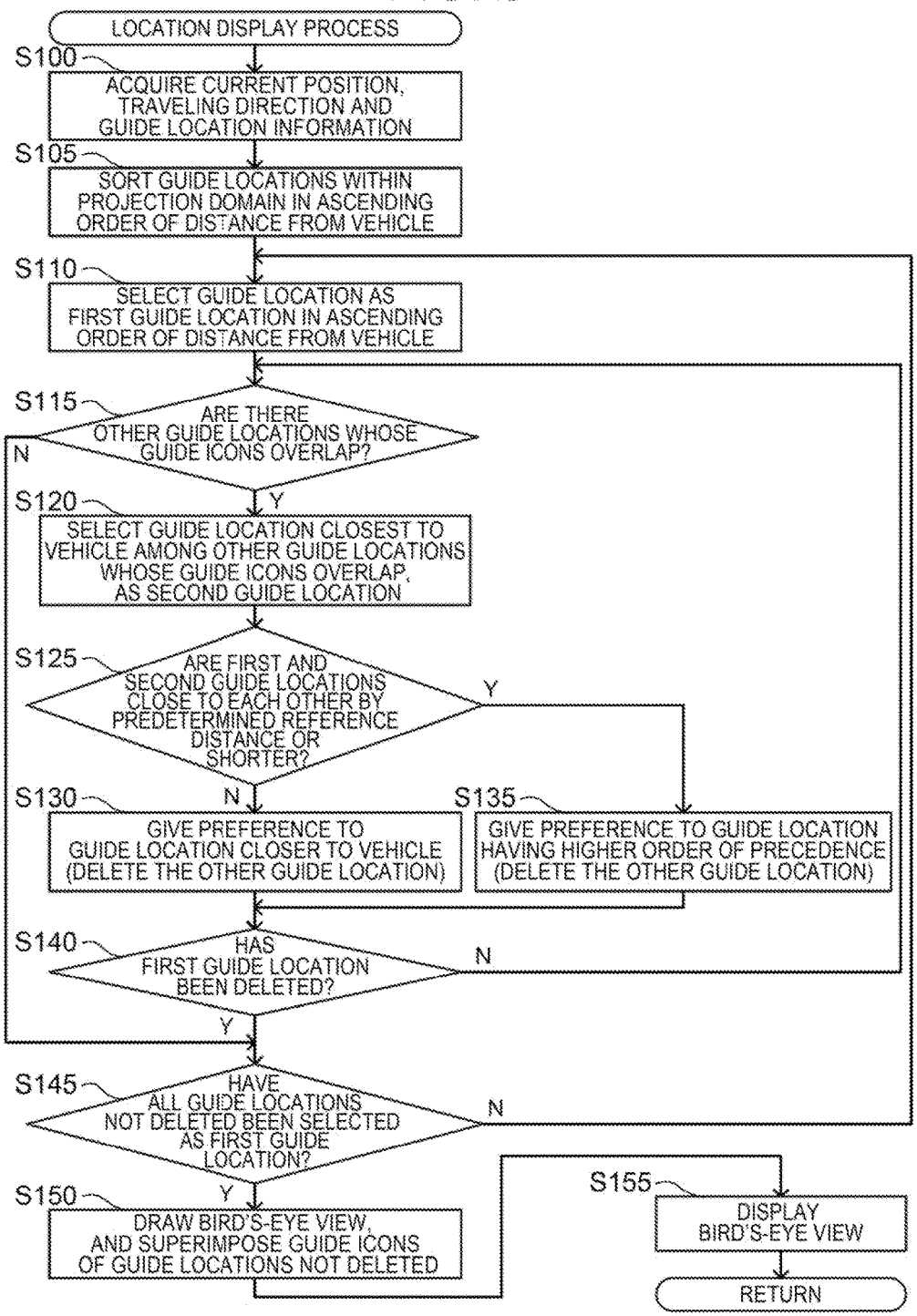

LOCATION DISPLAY SYSTEM, LOCATION DISPLAY METHOD, AND LOCATION DISPLAY PROGRAM

TECHNICAL FIELD

Related technical fields include location display systems, a location display methods, and a location display programs for displaying a guide for a location.

BACKGROUND

There is known a technique for sorting a plurality of POIs in order from the side far from an eyepoint and drawing POI icons on a map image in order from the side far from the eyepoint (see Japanese Patent Application Publication No. 2007-139931 (JP 2007-139931 A)). In JP 2007-139931 A, a POI icon (POI icon close to the eyepoint) that is drawn later is written over a POI icon far from the eyepoint on the map image, so it can be recognized such that the POI icon close to the eyepoint is located on the near side.

SUMMARY

In JP 2007-139931 A, when the position of the eyepoint changes in response to the position of a vehicle or a user's scroll operation, the POI close to the eyepoint may switch. That is, even when a first POI is closer to the eyepoint than a second POI at a certain point in time, the second POI can be closer to the eyepoint than the first POI at another point in time. In this case, the screen switches between the state where the POI icon of the second POI is written over the POI icon of the first POI and the state where the POI icon of the first POI is written over the POI icon of the second POI. Therefore, there is a problem that a POI icon on the near side switches and, as a result, a user experiences a feeling of strangeness.

Exemplary embodiments of the broad inventive principles described herein provide a technique for not causing an icon that is displayed preferentially to switch even when the position of an eyepoint changes.

According to exemplary embodiments, a location display system includes: guide location information acquisition means for acquiring guide location information that indicates positions of a plurality of guide locations; display means for displaying a bird's-eye view of a map, including the guide locations, as viewed from a reference eyepoint, and displaying guide icons that indicate the guide locations such that the guide icons are superimposed on positions corresponding to the guide locations in the bird's-eye view; and preference setting means for setting the guide icons such that, between a first one of the guide locations and a second one of the guide locations, the guide icon of one of the guide locations is displayed preferentially to the guide icon of the other guide location. When the first one of the guide locations and the second one of the guide locations are not close to each other by a predetermined reference distance or shorter, the preference setting means sets the guide icons such that, between the guide icon of the first one of the guide locations and the guide icon of the second one of the guide locations, the guide icon of the guide location closer to the reference eyepoint is displayed preferentially to the guide icon of the other guide location. On the other hand, when the first one of the guide locations and the second one of the guide locations are close to each other by the predetermined reference distance or shorter, the preference setting means sets the guide icons such that, between the guide icon of the first one of the guide locations and the guide icon of the second one of the guide locations, the guide icon of the guide location having a higher order of precedence in preset preference rules is displayed preferentially to the guide icon of the other guide location.

In the above configuration, when the first one of the guide locations and the second one of the guide locations are not close to each other by the predetermined reference distance or shorter, the guide icon of the guide location closer to the reference eyepoint is displayed preferentially to the guide icon of the other guide location. Thus, it is possible to preferentially display the guide icon of the guide location closer to the position of the reference eyepoint. For example, when the position of the reference eyepoint is set in response to the position of a vehicle or a user's scroll operation, it is possible to preferentially display the guide icon of the guide location closer to the vehicle or the guide icon of the guide location closer to the position to which the user has scrolled. When the first one of the guide locations and the second one of the guide locations are not close to each other by the predetermined reference distance or shorter, the guide icon of the first one of the guide locations and the guide icon of the second one of the guide locations are displayed at far positions on the bird's-eye view. Therefore, even when the guide location closer to the reference eyepoint switches between the first one of the guide location and the second one of the guide locations, the guide icon that is displayed preferentially just switches between the positions far from each other, so it is possible to prevent a user from experiencing a feeling of strangeness.

On the other hand, when the first one of the guide locations and the second one of the guide locations are close to each other by the predetermined reference distance or shorter, the guide icon of a preferential one of the guide locations on the basis of the preset preference rules is displayed preferentially to the guide icon of the other guide location. Thus, even when the guide location closer to the reference eyepoint switches between the first one of the guide locations and the second one of the guide locations, it is possible to prevent the guide icon that is displayed preferentially from switching. When the first one of the guide locations and the second one of the guide locations are close to each other by the predetermined reference distance or shorter, the guide icon of the first one of the guide locations and the guide icon of the second one of the guide locations are displayed at close positions on the bird's-eye view; however, it is possible to prevent the guide icon that is displayed preferentially from switching between the positions close to each other. Therefore, it is possible to prevent a user from experiencing a feeling of strangeness.

Each guide location just needs to be a location on a map, with which a guide icon is associated, and each guide icon just needs to be an image that indicates the details of the guide location. For example, the guide locations may be locations at which various facilities are provided, and the guide icons may be images that indicate pieces of information about various facilities. The bird's-eye view just needs to be a bird's-eye view of the map, including the guide locations, as viewed from the reference eyepoint, and may be a bird's-eye view of a map drawn on the basis of the map information. The bird's-eye view may be a photograph that a region including the guide locations is captured from above. In the bird's-eye view, the height of the reference eyepoint is set to a position higher than the ground. The positions corresponding to the guide locations in the bird's-eye view are positions at which objects at the guide locations are projected into the bird's-eye view.

Preferentially displaying the guide icon means that the preferential guide icon is displayed so as to be more easily recognized than the non-preferential guide icon. For example, the preferential guide icon may be set so as to be viewed on the near side by superimposing the preferential guide icon on the non-preferential guide icon. The size, chroma, contrast, opacity, or the like, of the preferential guide icon may be set so as to be larger than that of the non-preferential guide icon. The case where the first one of the guide locations and the second one of the guide locations are close to each other by the predetermined reference distance or shorter may be, for example, the case where the guide icons are displayed within a predetermined range on the bird's-eye view. Thus, it is possible to prevent the guide icon that is preferentially displayed from switching within the range of the predetermined distance on the bird's-eye view. The preset preference rules just need to be rules independent of the position of the reference eyepoint, and may be, for example, rules set by a user or a maker.

When a horizontal distance between the first one of the guide locations and the second one of the guide locations is longer than a threshold, the preference setting means may determine that the first one of the guide locations and the second one of the guide locations are not close to each other by the predetermined reference distance or shorter. Between the first one of the guide locations and the second one of the guide locations, the timing at which the guide location closer to the reference eyepoint switches is the timing at which the straight line extending in a line of line from the reference eyepoint perpendicularly bisects the line segment that connects the first one of the guide locations with the second one of the guide locations. The distance between the guide icons on the bird's-eye view at this timing corresponds to the horizontal distance (straight-line distance) between the first one of the guide locations and the second one of the guide locations. That is, when the horizontal distance between the first one of the guide locations and the second one of the guide locations is sufficiently large, it may be estimated that a sufficiently large distance is ensured between the guide icons in the bird's-eye view at the timing at which the guide location closer to the reference eyepoint switches. At the time when the guide icon that is displayed preferentially switches, when the distance between the guide icons is sufficiently large in the bird's-eye view, a user does not experience a feeling of strangeness. Therefore, when the horizontal distance between the first one of the guide locations and the second one of the guide locations is longer than the threshold, the guide icon of the guide location closer to the reference eyepoint is preferentially displayed. Thus, if the guide location closer to the reference eyepoint switches, it is possible to prevent a user from experiencing a feeling of strangeness. The threshold may be set on the basis of the size of the guide icon, and may be, for example, the lower limit value of the horizontal distance at which the guide icons do not overlap with each other on the bird's-eye view. Thus, it is possible to prevent the guide icon that is displayed preferentially from switching in a state where the guide icons overlap with each other on the bird's-eye view.

When the guide icon of the first one of the guide locations and the guide icon of the second one of the guide locations overlap with each other on the bird's-eye view, the preference setting means may set the guide icons such that, between the guide icon of the first one of the guide locations and the guide icon of the second one of the guide locations, one is displayed preferentially to the other.

Thus, when one of the guide icon of the first one of the guide locations and the guide icon of the second one of the guide locations is covered by the other, it is possible to display the guide icon of the guide location closer to the reference eyepoint or the guide icon of the guide location having a higher order of precedence in the preference rules, preferentially to the guide icon of the other guide location.

Between the guide icon of the first one of the guide locations and the guide icon of the second one of the guide locations, the display means may display the guide icon of a preferential one of the guide locations, and may not display the guide icon of the other guide location. That is, the display means may preferentially display the guide icon of a preferential one of the guide locations by not displaying the guide icon of a non-preferential one of the guide locations. In this case, it is possible to prevent such a situation that a non-displayed guide icon is suddenly displayed or a displayed guide icon is suddenly not displayed.

The technique for displaying guide icons is applicable as a program or a method. The case where the above-described system, program, or method is implemented by a single device, the case where the system, program or method is implemented by a plurality of devices, and the case where the system, program or method is implemented by utilizing components shared by portions of a vehicle, is conceivable, and various modes are included. For example, it is possible to provide a navigation system, method or program, including the above-described devices. The above technique may be modified as appropriate; for example, part of the technique is software or part of the technique is hardware. The method may also be implemented as a storage medium storing a program that controls the system. As a matter of course, the storage medium storing software may be a magnetic storage medium or may be a magnetooptical storage medium, and any storage media that will be developed in the future may also be used similarly.

BRIEF DESCRIPTION OF THE DRAWINGS

FIG. 1 is a block diagram of a navigation system.
FIG. 2A is a view that illustrates a projection domain, FIG. 2B is a view that illustrates a reference eyepoint, and FIG. 2C is a bird's-eye view.
FIG. 3 is a flowchart of a location display process.

DETAILED DESCRIPTION OF EXEMPLARY EMBODIMENTS

An embodiment will be described in accordance with the following sequence.
(1) Configuration of Navigation System
(2) Location Display Process
(3) Other Embodiments (1) Configuration of Navigation System FIG. 1 is a block diagram that shows the configuration of a navigation system 10 that is a location display system according to the embodiment. The navigation system 10 is provided in a vehicle V. The navigation system 10 includes a control unit 20 and a storage medium 30. The control unit 20 includes a CPU, a RAM, a ROM, and the like, and executes programs stored in the storage medium 30 or the ROM. The storage medium 30 stores map information 30a, guide location information 30b, icon data 30c, preference rule data 30d, and a position conversion table 30e. (As used herein the term "storage medium" is not intended to encompass transitory signals.) The map information 30a includes node data for identifying the positions of nodes corresponding to the end points of roads, link data that indicate roads between nodes, shape interpolation point data for identifying the shapes of roads between nodes, and the like. The map information 30a further includes polygon data that indicate the shapes of roads, and the like, on grounds and the shapes of the grounds. The control unit 20 generates a map composed of the three-dimensional shapes of grounds, roads, and the like, on the basis of the polygon data, and draws a bird's-eye view of the map as viewed from a predetermined reference eyepoint.

The guide location information 30b is data that indicate the positions of a plurality of guide locations G. In the guide location information 30b, for each of the guide locations G, the position of the guide location G, the identification code of a guide icon, and the attribute of the guide location G are stored. The position of each guide location G is indicated by a map coordinate system, and is indicated by a combination of latitude, longitude and altitude. The identification code of each guide icon is a code for identifying a guide icon stored in the icon data 30c as image data. Therefore, the control unit 20 is able to acquire, from the icon data 30c, a guide icon corresponding to the guide location G on the basis of the identification code of the guide location G. The attribute of each guide location G is the attribute of a facility provided at the guide location G, and is information that distinguishes, for example, a refueling facility, a parking facility, a shop facility, an amusement facility, an educational facility, a transportation facility such as a station, and the like, from one another. In the present embodiment, the guide locations G are locations at which various facilities are provided. Guide icons are prepared one by one for the attributes of various facilities and the pieces of the detailed facility information of various facilities (for example, the brand name of a refueling facility), and an identification code unique to each type of guide icon is associated with each guide icon.

The preference rule data 30d are data that indicate preset preference rules. The preference rules are rules that define the orders of precedence in which guide icons are preferentially displayed for the respective attributes of the guide locations G. For example, in the preference rule data 30d, the orders of precedence may be defined in order of the attributes of a refueling facility, a parking facility, a shop facility, an amusement facility, an educational facility and a transportation facility. In the present embodiment, at the time of creating the guide location information 30b, the preference rule data 30d are also created at the same time. As a matter of course, the navigation system 10 may accept a user's operation to set preference rules indicated by the preference rule data 30d.

The position conversion table 30e is a table that defines the correspondence between a position in a vehicle coordinate system with reference to the current position and traveling direction of the vehicle V and a position in a bird's-eye view. FIG. 2A is a plan view that illustrates the vehicle coordinate system. The vehicle coordinate system is a coordinate system in which the current position of the vehicle V is set as an origin and a vehicle longitudinal axis, a vehicle transverse axis and an altitude axis are orthogonal to one another at the origin. The vehicle longitudinal axis is an axis that indicates a relative position (horizontal direction) with respect to the current position of the vehicle V in the traveling direction F (vehicle longitudinal direction) of the vehicle V. The vehicle transverse axis is an axis that indicates a relative position (horizontal direction) with respect to the current position of the vehicle V in a direction orthogonal to the traveling direction F of the vehicle V (vehicle width direction). The altitude axis (not shown) is an axis that indicates a relative height (vertical direction) with respect to the altitude of the current position of the vehicle V.

The bird's-eye view is a bird's-eye view of a ground as viewed at a predetermined depression angle A (the angle of a center optical axis) in the traveling direction F from the reference eyepoint S at which the horizontal position coincides with the current position of the vehicle V and the vertical position is set at a position higher by a predetermined height H from the altitude of the current position of the vehicle V. FIG. 2B is a schematic view that illustrates the reference eyepoint S. The control unit 20 identifies a projection domain T on the basis of viewing angles B (in the horizontal direction and the vertical direction) and the depression angle A with respect to the preset center optical axis, the position of the reference eyepoint S (the current position of the vehicle V and the height H), and the traveling direction F of the vehicle. The image of the projection domain T is projected into the bird's-eye view. The viewing angles B and the depression angle A are stored in the storage medium 30. The control unit 20 may set the viewing angles B, the depression angle A and the height H on the basis of a user's operation. The control unit 20 may accept a user's scroll operation and set the horizontal position of the reference eyepoint S in response to the scroll operation.

In the present embodiment, the bird's-eye view is a rectangular image, and, when the ground is a horizontal plane, the projection domain T has a trapezoidal shape in the horizontal direction as shown in FIG. 2A. The projection domain T is symmetric with respect to a straight line that extends in the traveling direction F of the vehicle, and has two sides (the vehicle V-side one is shorter) extending in the direction of the vehicle transverse axis orthogonal to the traveling direction F of the vehicle V. The control unit 20 generates a map composed of the three-dimensional shapes of a ground, roads, and the like, within the projection domain T on the basis of the polygon data of the map information 30a, and draws the bird's-eye view of the map as viewed from the reference eyepoint S.

The vehicle V includes a GPS receiving unit 41, a vehicle speed sensor 42, a gyro sensor 43, and a display 45. The GPS receiving unit 41 receives radio waves from GPS satellites, and outputs, to the control unit 20, signals for calculating the current position of the vehicle V via an interface (not shown). The vehicle speed sensor 42 outputs, to the control unit 20, a signal corresponding to the rotation speed of a wheel of the vehicle V. The gyro sensor 43 outputs, to the control unit 20, a signal corresponding to an angular acceleration that acts on the vehicle V. The control unit 20 sets a plurality of roads to be compared, on which the vehicle V can be present, on the basis of self-contained navigation information based on the signals output from the vehicle speed sensor 42 and the gyro sensor 43, and the map information 30a. The control unit 20 narrows down the roads to be compared, on the basis of an error circle of the GPS signals acquired by the GPS receiving unit 41. The control unit 20 executes map matching process for identifying the road that is the most similar in self-contained navigation trajectory and shape among the selected roads to be compared, as a traveling road that is the road on which the vehicle V is traveling. The control unit 20 identifies the current position of the vehicle V in the map coordinate system on the traveling road identified through the map matching process. The control unit 20 identifies the current traveling direction F of the vehicle V on the basis of the signal of the gyro sensor 43, the trajectory of the current position, and the like. The display 45 is a display device that displays the bird's-eye view and other navigation images.

The control unit 20 executes a location display program 21. The location display program 21 includes a guide location information acquisition unit 21a, a display unit 21b, and a preference setting unit 21c. The guide location information acquisition unit 21a is a module that causes the control unit 20 to execute the function of acquiring the guide location information 30b that indicates the positions of the plurality of guide locations G. With the function of the guide location information acquisition unit 21a, the control unit 20 acquires the guide location information 30b from the storage medium 30. With the function of the guide location information acquisition unit 21a, the control unit 20 identifies the projection domain T on the basis of the preset viewing angles B, the position of the reference eyepoint S (the current position of the vehicle V and the height H), the traveling direction F of the vehicle, and the depression angle A. The image of the projection domain T is projected into the bird's-eye view. The control unit 20 extracts, from the guide location information 30b, the guide locations G within the projection domain T in the horizontal direction.

The display unit 21b is a module of causing the control unit 20 to execute the function of displaying the bird's-eye view of the map, including the guide locations G, as viewed from the reference eyepoint S, and displaying the guide icons I for indicating the guide locations G so as to be superimposed on the positions corresponding to the guide locations G in the bird's-eye view. With the use of the function of the display unit 21b, the control unit 20 generates the map composed of the three-dimensional shapes of the ground, roads, and the like, within the projection domain T on the basis of the polygon data of the map information 30a, and draws the bird's-eye view of the map as viewed from the reference eyepoint S. FIG. 2C is a view that shows the bird's-eye view.

With the function of the display unit 21b, the control unit 20 converts the positions of the guide locations G in the map coordinate system to the positions in the vehicle coordinate system with reference to the current position and traveling direction F of the vehicle V. The control unit 20 acquires the positions in the bird's-eye view, corresponding to the positions of the guide locations G, by converting the positions of the guide locations G, indicated by the vehicle coordinate system, by using the position conversion table 30e. With the function of the display unit 21b, the control unit 20 acquires, from the icon data 30c, the guide icons I corresponding to the identification codes of the guide locations G within the projection domain T. The control unit 20 superimposes the guide icons I in the bird's-eye view such that the middle point of the base of each guide icon I is superimposed on the position within the bird's-eye view, corresponding to the position of the corresponding guide location G. The control unit 20 superimposes each guide icon I on the bird's-eye view for each of the guide locations G within the projection domain T. With the function of the display unit 21b, the control unit 20 causes the display 45 to display the bird's-eye view on which the guide icons I are superimposed. In the present embodiment, the outline shapes of the rectangular guide icons I are uniform irrespective of the guide locations G, and the size of each guide icon I is uniform irrespective of the distance from the reference eyepoint S to the corresponding guide location G. As shown in FIG. 2C, in the present embodiment, in order to display the rectangular guide icons I, each guide icon I shows a rectangular plane facing forward with respect to the vehicle V. The control unit 20 just needs to superimpose any one of the positions of the guide icons I on the position within the bird's-eye view, corresponding to the position of the corresponding guide location G, and may superimpose each guide icon I on the bird's-eye view such that the barycenter of the guide icon I is superimposed on the position within the bird's-eye view, corresponding to the position of the corresponding guide location G.

The preference setting unit 21c is a module that causes the control unit 20 to execute the function of setting the guide icons I such that, between the first guide location $G_1$ and the second guide location $G_2$, the guide icon I of one of the guide locations G is displayed preferentially to the guide icon I of the other guide location G. Specifically, with the function of the preference setting unit 21c, the control unit 20, when the guide icon I of the first guide location $G_1$ and the guide icon I of the second guide location $G_2$ overlap with each other on the bird's-eye view, sets the guide icons I such that, between the guide icon I of the first guide location $G_1$ and the guide icon I of the second guide location $G_2$, one is displayed preferentially to the other. That is, among the guide locations G within the projection domain T, the control unit 20 extracts the guide locations G in such a positional relationship that the corresponding guide icons I overlap with each other on the bird's-eye view as the first guide location $G_1$ and the second guide location $G_2$, and sets the guide icons I such that, between these guide locations, the guide icon I of one of these is displayed preferentially to the guide icon I of the other.

With the function of the preference setting unit 21c, the control unit 20 acquires the positions within the bird's-eye view, corresponding to the positions of the guide locations G within the projection domain T, and identifies superimposed regions of the guide icons I in the case where the guide icons I are superimposed on the bird's-eye view such that the positions coincide with the positions of the middle points of the bases. When the superimposed regions of the guide icons I overlap with each other, the control unit 20 selects the guide locations G corresponding to the respective two guide icons I whose superimposed regions overlap with each other as the first guide location $G_1$ and the second guide location $G_2$. The state where the superimposed regions of the guide icons I overlap with each other means that at least part of the superimposed region of the guide icon I overlaps with at least part of the superimposed region of the other guide icon I. When regions expanding inward a predetermined distance from outer peripheries within the superimposed regions of the guide icons I, the control unit 20 may select the guide locations G corresponding to the two guide icons I whose inward regions overlap with each other as the first guide location $G_1$ and the second guide location $G_2$.

With the function of the preference setting unit 21c, when the first guide location $G_1$ and the second guide location $G_2$ are not close to each other by a predetermined reference distance or shorter, the control unit 20 sets the guide icons I such that, between the guide icon I of the first guide location $G_1$ and the guide icon I of the second guide location $G_2$, the guide icon I of the guide location G closer to the reference eyepoint S is displayed preferentially to the guide icon I of the other guide location G. Specifically, with the function of the preference setting unit 21c, when a horizontal distance L between the first guide location $G_1$ and the second guide location $G_2$ is longer than a threshold $L_T$, the control unit 20 determines that the first guide location $G_1$ and the second guide location $G_2$ are not close to each other by the predetermined reference distance or shorter. The control unit 20 acquires the position of the first guide location $G_1$ and the position of the second guide location $G_2$ from the guide location information 30b, and determines whether the Euclidean distance in the horizontal direction between these positions is longer than the threshold $L_T$. The threshold $L_T$ is stored in the storage medium 30, and is set to a distance within a real space, corresponding to the lateral width of the guide icon I. The distance within the real space, corresponding to the width of the guide icon I in the lateral direction, depends on the position of the guide icon I in the bird's-eye view (the guide icon I at the upper side of the bird's-eye view has a larger width in the real space); however, in the present embodiment, the distance in the real space, corresponding to the lateral width of the guide icon I superimposed on the barycenter of the bird's-eye view, is set for the threshold $L_T$. As the horizontal distance between the first guide location $G_1$ and the second guide location $G_2$ with respect to the current position of the vehicle V increases, the distance in the real space, corresponding to the width of the guide icon I, increases. Therefore, the control unit 20 may set the threshold $L_T$ to a larger value as the horizontal distance increases.

With the function of the preference setting unit 21c, the control unit 20 calculates the Euclidean distance in the horizontal direction between the position of the first guide location $G_1$ and the current position of the vehicle V and the Euclidean distance in the horizontal direction between the position of the second guide location $G_2$ and the current position of the vehicle V, and sets the images of the guide locations G such that the guide location G that is shorter in the Euclidean distance is preferentially displayed. Specifically, with the function of the preference setting unit 21c, the control unit 20 sets the guide icons I such that, between the guide icon I of the first guide location $G_1$ and the guide icon I of the second guide location $G_2$, the guide icon I of a preferential one of the guide locations G is displayed and the guide icon I of the other guide location G is not displayed. Therefore, when the guide icons I overlap with each other, only one of the guide icons I that overlap with each other is displayed.

On the other hand, with the function of the preference setting unit 21c, when the first guide location $G_1$ and the second guide location $G_2$ are close to each other by the predetermined reference distance or shorter, the control unit 20 sets the guide icons I such that, between the guide icon I of the first guide location $G_1$ and the guide icon I of the second guide location $G_2$, the guide icon I of the guide location G having a higher order of precedence in the preset preference rules is displayed preferentially to the guide icon I of the other guide location G. In the present embodiment, in the preference rule data 30d, the orders of precedence are defined in order of the attributes of a refueling facility, a parking facility, a shop facility, an amusement facility, an educational facility and a transportation facility, and, with the function of the preference setting unit 21c, the control unit 20 sets the guide icons I such that the guide icon I of the guide location G, whose attribute has a higher order of precedence, is preferentially displayed. When the attribute of the first guide location $G_1$ and the attribute of the second guide location $G_2$ are the same, the control unit 20 may set a preferential one of the guide locations G on the basis of other rules that are independent of the position of the vehicle V. For example, the control unit 20 may set the images of the guide locations G such that, between the first guide location $G_1$ and the second guide location $G_2$, the guide location G that is entered later, the guide location G whose attribute is more frequently set as a destination in route searching, or the like, is preferentially displayed.

In the configuration of the above-described present embodiment, when the first guide location $G_1$ and the second guide location $G_2$ are not close to each other by the predetermined reference distance or shorter, the guide icon I of the guide location G closer to the reference eyepoint S is displayed preferentially to the guide icon I of the other guide location G. Thus, it is possible to preferentially display the guide icon I of the guide location G closer to the position of the reference eyepoint S. Therefore, it is possible to preferentially display the guide icon I of the guide location G closer to the current position of the vehicle V. When the first guide location $G_1$ and the second guide location $G_2$ are not close to each other by the predetermined reference distance or shorter, the guide icon I of the first guide location $G_1$ and the guide icon I of the second guide location $G_2$ are displayed at positions far from each other on the bird's-eye view. Therefore, even when the guide location closer to the reference eyepoint S switches between the first guide location $G_1$ and the second guide location $G_2$, the guide icon I that is displayed preferentially just switches between the positions far from each other, so it is possible to prevent a user from experiencing a feeling of strangeness. For example, in FIG. 2C (within the circle W1 indicated by the alternate long and short dash line), between the guide icon I (continuous line) of a first guide location $G_{1A}$ and the guide icon I (dashed line) of a second guide location $G_{2A}$, the guide icon I of the first guide location $G_{1A}$ closer to the vehicle V is displayed, and the guide icon I of the other second guide location $G_{2A}$ is not displayed.

On the other hand, when the first guide location $G_1$ and the second guide location $G_2$ are close to each other by the predetermined reference distance or shorter, the guide icon I of a preferential one of the guide locations G on the basis of the preset preference rules is displayed preferentially to the guide icon I of the other guide location G. Thus, even when the guide location G closer to the reference eyepoint S switches between the first guide location $G_1$ and the second guide location $G_2$, it is possible to prevent the guide icon I that is displayed preferentially from switching. When the first guide location $G_1$ and the second guide location $G_2$ are close to each other by the predetermined reference distance or shorter, the guide icon I of the first guide location $G_1$ and the guide icon I of the second guide location $G_2$ are displayed at the positions close to each other on the bird's-eye view; however, it is possible to prevent the guide icon I that is displayed preferentially from switching between the positions close to each other. Therefore, it is possible to prevent a user from experiencing a feeling of strangeness. For example, in FIG. 2C (within the circle W2 indicated by the alternate long and two short dashes line), between the guide icon I (dashed line) of a first guide location $G_{1B}$ whose attribute is a shop facility and the guide icon I (continuous line) of a second guide location $G_{2B}$ whose attribute is a refueling facility, the guide icon I of the second guide location $G_{2B}$ whose attribute has a higher order of precedence is displayed, and the guide icon I of the other first guide location $G_{1B}$ is not displayed.

Between the first guide location $G_1$ and the second guide location $G_2$, the timing at which the guide location G closer to the reference eyepoint S switches is the timing at which the straight line extending in a line of sight (traveling direction F) from the reference eyepoint S perpendicularly bisects the line segment that connects the first guide location $G_1$ and the second guide location $G_2$. The distance between the guide icons I on the bird's-eye view at this point in time corresponds to the horizontal distance L between the first guide location $G_1$ and the second guide location $G_2$. As shown in FIG. 2A, in the projection domain T, at the timing at which the vehicle longitudinal axis corresponding to the traveling direction F of the vehicle V constitutes the perpendicular bisector for the line segment (wide line) that connects the first guide location $G_1$ (white circle) and the second guide location $G_2$ (white circle), the guide location G closer to the current position (the position of the reference eyepoint S) of the vehicle V switches. Therefore, when the horizontal distance L between the first guide location $G_1$ and the second guide location $G_2$ is sufficiently large, it may be estimated that a sufficiently large distance is ensured between the guide icons I (dashed line) (when both are displayed) in the bird's-eye view at the timing at which the guide location closer to the reference eyepoint S switches. At the time when the guide icon I that is displayed preferentially switches, when the distance between the guide icons I is sufficiently large in the bird's-eye view, the user does not experience a feeling of strangeness. Therefore, when the horizontal distance L between the first guide location $G_1$ and the second guide location $G_2$ is longer than the threshold $L_T$, the guide icon I of the guide location G closer to the reference eyepoint S is preferentially displayed. Thus, even if the guide location G closer to the reference eyepoint S switches, it is possible to prevent a user from experiencing a feeling of strangeness.

In the present embodiment, the threshold $L_T$ corresponds to the lateral width of the guide icon I, so the threshold $L_T$ corresponds to the lower limit value of the horizontal distance L, at which the guide icons I do not overlap with each other on the bird's-eye view. Thus, it is possible to prevent the guide icon I that is displayed preferentially from switching in a state where the guide icons I overlap with each other on the bird's-eye view. The fact that the horizontal distance L between the first guide location $G_1$ and the second guide location $G_2$ is shorter than or equal to the threshold $L_T$ means that, as shown in FIG. 2A, the guide icons I overlap with each other on the bird's-eye view at the timing at which the guide location G closer to the reference eyepoint S switches. However, when the horizontal distance L between the first guide location $G_1$ and the second guide location $G_2$ is shorter than or equal to the threshold $L_T$, the guide icon I of one of the first guide location $G_1$ and the second guide location $G_2$, having a higher order of precedence, is preferentially displayed at all times, so it is possible to prevent the guide icon I that is displayed preferentially from switching in a state where the guide icons I overlap with each other on the bird's-eye view. For example, even when the vehicle V has moved in such a way that the second guide location $G_{2B}$, the first guide location $G_{1B}$ and the reference eyepoint S in FIG. 2C (within the circle W2 indicated by the alternate long and two short dashes line) are in the positional relationship shown in FIG. 2A, it is possible to continue to preferentially display the guide icon I (continuous line) of the second guide location $G_{2B}$. However, the threshold $L_T$ just needs to be a distance at which a sufficiently large distance is ensured between the guide icons I in the bird's-eye view, and may be a distance, such as twice as large as the distance in the real space, corresponding to the lateral width of the guide icon I.

With the function of the preference setting unit 21c, when the guide icon I of the first guide location $G_1$ and the guide icon I of the second guide location $G_2$ overlap with each other on the bird's-eye view, the control unit 20 sets the guide icons I such that, between the guide icon I of the first guide location $G_1$ and the guide icon I of the second guide location $G_2$, one is displayed preferentially to the other. Thus, when one of the guide icon I of the first guide location $G_1$ and the guide icon I of the second guide location $G_2$ is covered by the other, it is possible to preferentially display the guide icon I of one of the guide locations G to the guide icon I of the other guide location G. As described above, the fact that the horizontal distance L between the first guide location $G_1$ and the second guide location $G_2$ is shorter than or equal to the threshold $L_T$ means that, as shown in FIG. 2A, the guide icons I overlap with each other on the bird's-eye view at the timing at which the guide location G closer to the reference eyepoint S switches. Therefore, when the guide location G closer to the reference eyepoint S switches while the guide icon I of the first guide location $G_1$ and the guide icon I of the second guide location $G_2$ keep overlapping with each other on the bird's-eye view, the guide icon I of one of the first guide location $G_1$ and the second guide location $G_2$, having a higher order of precedence, is preferentially displayed at all times. At the timing at which the vehicle V has moved in such a way that the second guide location $G_{2A}$, the first guide location $G_{1A}$ and the reference eyepoint S in FIG. 2C (within the circle W1 indicated by the alternate long and short dash line) are in the positional relationship shown in FIG. 2A, the guide icon I (continuous line) of the first guide location $G_{1A}$ and the guide icon I (dashed line) of the second guide location $G_{2A}$ do not overlap with each other on the bird's-eye view. Therefore, even when the guide icon I of the guide location G closer to the vehicle V switches between the guide icon I of the first guide location $G_{1A}$ and the guide icon I of the second guide location $G_{2A}$ so as to be preferentially displayed, it is possible to prevent a user from experiencing a feeling of strangeness.

In the present embodiment, with the function of the preference setting unit 21c, the control unit 20 employs such a configuration that the guide icon I of a non-preferential one of the guide locations G is not displayed, so it is possible to prevent such a situation that a non-displayed guide icon I is suddenly displayed or a displayed guide icon I is suddenly not displayed.

(2) Location Display Process

FIG. 3 is a flowchart of a location display process. The location display process is a process that is executed at intervals of a predetermined time or intervals of a predetermined travel distance. Initially, with the function of the guide location information acquisition unit 21a, the control unit 20 acquires the current position of the vehicle V, the traveling direction F, and the guide location information 30b (step S100). Subsequently, with the function of the guide location information acquisition unit 21a, the control unit 20 extracts the guide locations G within the projection domain T, and sorts the extracted guide locations G in ascending order of distance from the vehicle V (step S105). Specifically, the control unit 20 identifies the projection domain T, whose image is projected into the bird's-eye view, on the basis of the preset viewing angles B, the position of the reference eyepoint S (the current position of the vehicle V and the height H), the traveling direction F of the vehicle, and the depression angle A. The control unit 20 converts the positions of the guide locations G to the positions in the vehicle coordinate system, and extracts, from the guide location information 30b, the guide locations G within the projection domain T in the horizontal direction. The control unit 20 calculates the Euclidean distance in the horizontal direction between the current position of the vehicle V and each guide location G, and sorts the guide locations G in ascending order of the Euclidean distance, thus generating a list (not shown) of the guide locations G.

Subsequently, with the function of the preference setting unit 21c, the control unit 20 selects the guide location G as the first guide location $G_1$ in ascending order of distance from the vehicle V (step S110). That is, the control unit 20 selects one guide location G stored in the order from the top in step S105, and sets the selected guide location G for the first guide location $G_1$. With the function of the preference setting unit 21c, the control unit 20 determines whether there are other guide locations G whose guide icons I overlap with the guide icon I of the first guide location $G_1$ on the bird's-eye view (step S115). That is, the control unit 20 acquires the positions in the bird's-eye view, corresponding to the positions of the guide locations G within the projection domain T, and identifies the superimposed regions of the guide icons I in the case where the guide icons I are superimposed on the bird's-eye view such that the positions coincide with the positions of the middle points of the corresponding bases. The control unit 20 determines whether there are other guide locations G whose superimposed regions of the guide icons I overlap with the superimposed region of the guide icon I of the guide location G selected as the first guide location $G_1$.

When it is determined that there are other guide locations G of which the guide icons I overlap with the guide icon I of the first guide location $G_1$ on the bird's-eye view (Y in step S115), the guide location G closest to the vehicle V (reference eyepoint S) is selected as the second guide location $G_2$ from among the other guide locations G whose guide icons I overlap with the guide icon I of the first guide location $G_1$ on the bird's-eye view (step S120). That is, with the function of the preference setting unit 21c, the control unit 20 selects the pair of guide locations G whose guide icons I overlap with each other on the bird's-eye view as the first guide location $G_1$ and the second guide location $G_2$.

Subsequently, with the function of the preference setting unit 21c, the control unit 20 determines whether the first guide location $G_1$ and the second guide location $G_2$ are close to each other by the predetermined reference distance or shorter (step S125). Specifically, with the function of the preference setting unit 21c, when the horizontal distance L between the first guide location $G_1$ and the second guide location $G_2$ is longer than the threshold $L_T$, the control unit 20 determines that the first guide location $G_1$ and the second guide location $G_2$ are not close to each other by the predetermined reference distance or shorter. When it is not determined that the first guide location $G_1$ and the second guide location $G_2$ are close to each other by the predetermined reference distance or shorter (N in step S125), with the function of the preference setting unit 21c, the control unit 20 sets the guide icons I such that, between the guide icon I of the first guide location $G_1$ and the guide icon I of the second guide location $G_2$, the guide icon I of the guide location G closer to the reference eyepoint S is displayed preferentially to the guide icon I of the other guide location G.

Specifically, with the function of the preference setting unit 21c, the control unit 20 sets the images of the guide locations G such that, between the first guide location $G_1$ and the second guide location $G_2$, the guide location G whose Euclidean distance from the current position of the vehicle V in the horizontal direction is shorter is preferentially displayed. More specifically, with the function of the preference setting unit 21c, the control unit 20 deletes a non-preferential one of the guide locations G from the list of the guide locations G such that, between the guide icon I of the first guide location $G_1$ and the guide icon I of the second guide location $G_2$, the guide icon I of the non-preferential one of the guide locations G is not displayed. On the other hand, the control unit 20 does not delete a preferential one of the guide locations G from the list of the guide locations G such that the guide icon I of the preferential one of the guide locations G is displayed.

When it is determined that the first guide location $G_1$ and the second guide location $G_2$ are close to each other by the predetermined reference distance or shorter (Y in step S125), with the function of the preference setting unit 21c, the control unit 20 sets the guide icons I such that, between the guide icon I of the first guide location $G_1$ and the guide icon I of the second guide location $G_2$, the guide icon I of the guide location G having a higher order of precedence in the preset preference rules is displayed preferentially to the guide icon I of the other guide location G (step S135). In the present embodiment, the orders of precedence are defined in order of the attributes of a refueling facility, a shop facility, an amusement facility, an educational facility and a transportation facility in the preference rule data 30d, and, with the function of the preference setting unit 21c, the control unit 20 sets the guide icons I such that the guide icon I whose attribute has a higher order of precedence is preferentially displayed. As in the case of step S130, between the guide icon I of the first guide location $G_1$ and the guide icon I of the second guide location $G_2$, the control unit 20 deletes a non-preferential one of the guide locations G from the list of the guide locations G, and does not delete a preferential one of the guide locations G from the list of the guide locations G.

As described above, when the first guide location $G_1$ or the second guide location $G_2$ is deleted from the list of the guide locations G in step S130 or step S135, the control unit 20 executes step S140. That is, with the function of the preference setting unit 21c, the control unit 20 determines whether the first guide location $G_1$ has been deleted from the list of the guide locations G (step S140). When it is not determined that the first guide location $G_1$ has been deleted from the list of the guide location G (N in step S140), with the function of the preference setting unit 21c, the control unit 20 returns to step S115, and continues the process for the current first guide location $G_1$.

On the other hand, when it is determined that the first guide location $G_1$ has been deleted from the list of the guide locations G (Y in step S140), with the function of the preference setting unit 21c, the control unit 20 determines whether all the guide locations G not deleted in the list of the guide locations G have been selected as the first guide location $G_1$ (step S145). When it is not determined that all the guide locations G not deleted in the list of the guide locations G have been selected as the first guide location $G_1$ (N in step S145), the control unit 20 returns to step S110, and selects the guide location G second closest to the vehicle V as the first guide location $G_1$.

When it is determined that all the guide locations G not deleted in the list of the guide locations G have been selected as the first guide location $G_1$, with the function of the display unit 21b, the control unit 20 draws the bird's-eye view, and superimposes the guide icons I of the guide locations G not deleted in the list of the guide locations G on the bird's-eye view (step S150). With the function of the display unit 21b, the control unit 20 draws the bird's-eye view in the case where a bird's-eye view of the projection domain T is obtained from the reference eyepoint S on the basis of the polygon data of the map information 30a, and identifies the positions in the bird's-eye view, corresponding to the positions of the guide locations G not deleted in the list of the guide locations G. With the function of the display unit 21b, the control unit 20 acquires, from the icon data 30c, the guide icons I corresponding to the identification codes associated with the guide locations G within the projection domain T. The control unit 20 superimposes the guide icons I on the bird's-eye view such that the middle points of the bases of the guide icons I are superimposed on the positions within the bird's-eye view, corresponding to the positions of the guide locations G not deleted in the list of the guide locations G. In this manner, when the guide icons I are superimposed on the bird's-eye view, with the function of the display unit 21b, the control unit 20 causes the bird's-eye view to be displayed on the display 45 (step S155).

(3) Other Embodiments

Each guide location G just needs to be a location on a map, with which a guide icon I is associated, and each guide icon I just needs to be an image that indicates the details of the guide location G. For example, each guide location G may be a location at which traffic regulation is provided on a road or a location at which there is traffic congestion, and each guide icon I may be an image that indicates the details of traffic regulation or an image that indicates the degree of traffic congestion. The bird's-eye view just needs to be a bird's-eye view of the map, including the guide locations G, as viewed from the reference eyepoint S, and may be a photograph that a region including the guide locations G is captured from above.

Preferentially displaying the guide icon I means that the preferential guide icon I is displayed so as to be more easily recognized than the non-preferential guide icon I. For example, the preferential guide icon I may be set so as to be viewed on the near side by superimposing the preferential guide icon I on the non-preferential guide icon I. The size, chroma, contrast, opacity, or the like, of the preferential guide icon I may be set so as to be larger than that of the non-preferential guide icon I. The preset priority rules just need to be rules independent of the position of the reference eyepoint S, and may be, for example, rules set by a user.

With the function of the preference setting unit 21c, when the guide icon I of the first guide location $G_1$ and the guide icon I of the second guide location $G_2$ overlap with each other on the bird's-eye view, the control unit 20 does not always need to set the guide icons I such that, between the guide icon I of the first guide location $G_1$ and the guide icon I of the second guide location $G_2$, one is displayed preferentially to the other. For example, when the first guide location $G_1$ and the second guide location $G_2$ are similar to each other (for example, when the first guide location $G_1$ and the second guide location $G_2$ correspond to facilities of the same attribute), the control unit 20 may set the guide icons I such that, between the guide icon I of the first guide location $G_1$ and the guide icon I of the second guide location $G_2$, one is displayed preferentially to the other. Thus, it is possible to prevent the guide icons I that indicate similar details from being displayed so as to overlap with each other.

In the above embodiment, the reference eyepoint S is set in response to the current position of the vehicle V. Instead, the reference eyepoint S may be set in response to a user's scroll operation. As a matter of course, the process may be executed in the case where the reference eyepoint S moves along a scheduled travel route found in advance.

The invention claimed is:

1. A location display system comprising:
a display;
a memory storing a location display program; and
a processor that, when executing the stored location display program:
acquires guide location information that indicates positions of a plurality of guide locations;
displays a bird's-eye view of a map on the display, the map including the plurality of guide locations, as viewed from a reference point;
displays guide icons that indicate the plurality of guide locations such that the guide icons are superimposed on positions corresponding to the plurality of guide locations in the bird's-eye view of the map;
in response to a horizontal distance between a first one of the plurality of guide locations and a second one of the plurality of the guide locations being longer than a predetermined threshold, determines that the first one of the plurality of guide locations and the second one of the plurality of guide locations are not close to each other by a predetermined reference distance or shorter,
sets, in response to the first one of the plurality of guide locations and the second one of the plurality of guide locations being determined to be not close to each other by the predetermined reference distance or shorter, the guide icons such that one of a guide icon of the first one of the plurality of guide locations and a guide icon of the second one of the plurality of guide locations, which is determined to be closer to the reference point, is displayed in a more visually prominent manner than another one of the guide icon of the first one of the plurality of guide locations and the guide icon of the second one of the plurality of guide locations; and
sets, in response to the first one of the plurality of guide locations and the second one of the plurality of guide locations being determined to be close to each other by the predetermined reference distance or shorter, the guide icons such that one of the guide icon of the first one of the plurality of guide locations and the guide icon of the second one of the plurality of guide locations having a higher order of precedence in preset preference rules is displayed in a more visually prominent manner than another one of the guide icon of the first one of the plurality of guide locations and the guide icon of the second one of the plurality of guide locations.

2. The location display system according to claim 1, wherein the processor, when executing the stored location display program:
in response to the guide icon of the first one of the plurality of guide locations and the guide icon of the second one of the plurality of guide locations overlap with each other in the bird's-eye view of the map, sets one of the guide icon of the first one of the plurality of guide locations and the guide icon of the second one of the plurality of guide locations to be displayed in a more visually prominent manner than another one of the guide icon of the first one of the plurality of guide locations and the guide icon of the second one of the plurality of guide locations.

3. The location display system according to claim 1, wherein the processor, when executing the stored location display program:
displays the one of the guide icon of the first one of the plurality of guide locations and the guide icon of the second one of the plurality of guide locations that is displayed in the more visually prominent manner, and does not display the other one of the guide icon of the first one of the plurality of guide locations and the guide icon of the second one of the plurality of guide locations.

4. A location display method comprising:

acquiring guide location information that indicates positions of a plurality of guide locations;

displaying a bird's-eye view of a map on a display, the map including the plurality of guide locations, as viewed from a reference point;

displaying guide icons that indicate the plurality of guide locations such that the guide icons are superimposed on positions corresponding to the plurality of guide locations in the bird's-eye view of the map;

in response to a horizontal distance between a first one of the plurality of guide locations and a second one of the plurality of the guide locations being longer than a predetermined threshold, determining that the first one of the plurality of guide locations and the second one of the plurality of guide locations are not close to each other by a predetermined reference distance or shorter;

in response to the first one of the plurality of guide locations and the second one of the plurality of guide locations being determined to be not close to each other by the predetermined reference distance or shorter, setting the guide icons such that one of a guide icon of the first one of the plurality of guide locations and a guide icon of the second one of the plurality of guide locations, which is determined to be closer to the reference point, is displayed in a more visually prominent manner than another one of the guide icon of the first one of the plurality of guide locations and the guide icon of the second one of the plurality of guide locations; and in response to the first one of the plurality of guide locations and the second one of the plurality of guide locations being determined to be close to each other by the predetermined reference distance or shorter, setting the guide icons such that one of the guide icon of the first one of the plurality of guide locations and the guide icon of the second one of the plurality of guide locations having a higher order of precedence in preset preference rules is displayed in a more visually prominent manner than another one of the guide icon of the first one of the plurality of guide locations and the guide icon of the second one of the plurality of guide locations.

5. A non-transitory computer-readable storage medium storing a computer-executable location display program, the location display program comprising:

instructions for acquiring guide location information that indicates positions of a plurality of guide locations;

instructions for displaying a bird's-eye view of a map on a display, the map including the plurality of guide locations, as viewed from a reference point;

instructions for displaying guide icons that indicate the plurality of guide locations such that the guide icons are superimposed on positions corresponding to the plurality of guide locations in the bird's-eye view of the map;

instructions for, in response to a horizontal distance between a first one of the plurality of guide locations and a second one of the plurality of the guide locations being longer than a predetermined threshold, determining that the first one of the plurality of guide locations and the second one of the plurality of guide locations are not close to each other by a predetermined reference distance or shorter;

instructions for, in response to the first one of the plurality of guide locations and the second one of the plurality of guide locations being determined to be not close to each other by a predetermined reference distance or shorter, setting the guide icons such that one of a guide icon of the first one of the plurality of guide locations and a guide icon of the second one of the plurality of guide locations, which is determined to be closer to the reference point, is displayed in a more visually prominent manner than another one of the guide icon of the first one of the plurality of guide locations and the guide icon of the second one of the plurality of guide locations; and instructions for, in response to the first one of the plurality of guide locations and the second one of the plurality of guide locations being determined to be close to each other by the predetermined reference distance or shorter, setting the guide icons such that one of the guide icon of the first one of the plurality of guide locations and the guide icon of the second one of the plurality of guide locations having a higher order of precedence in preset preference rules is displayed in a more visually prominent manner than another one of the guide icon of the first one of the plurality of guide locations and the guide icon of the second one of the plurality of guide locations.

\* \* \* \* \*